US010028224B2

(12) United States Patent
Papakipos et al.

(10) Patent No.: US 10,028,224 B2
(45) Date of Patent: Jul. 17, 2018

(54) SUBSTANTIALLY CONTINUOUS LOCATION LOGGING FOR GEOGRAPHIC-POSITIONING CAPABLE DEVICES

(71) Applicant: Facebook, Inc., Menlo Park, CA (US)

(72) Inventors: Matthew Nicholas Papakipos, Portola Valley, CA (US); Lev Popov, San Francisco, CA (US); Iain Andrew Russell Proctor, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/279,228

(22) Filed: Sep. 28, 2016

(65) Prior Publication Data

US 2017/0019856 A1 Jan. 19, 2017

Related U.S. Application Data

(63) Continuation of application No. 13/417,013, filed on Mar. 9, 2012, now Pat. No. 9,491,603.

(51) Int. Cl.
*H04W 52/02* (2009.01)
*G06Q 10/10* (2012.01)
(Continued)

(52) U.S. Cl.
CPC ........ *H04W 52/0248* (2013.01); *G06Q 10/10* (2013.01); *G06Q 30/0251* (2013.01);
(Continued)

(58) Field of Classification Search
CPC .................................. H04W 4/23; H04W 4/28
(Continued)

(56) References Cited

U.S. PATENT DOCUMENTS

2004/0204184 A1 10/2004 Lin
2005/0192741 A1* 9/2005 Nichols ............... G01C 21/20
701/1

(Continued)

FOREIGN PATENT DOCUMENTS

CN 1774135 A 5/2006
JP 2015-513266 4/2015
WO WO 2008/112511 A1 9/2008

OTHER PUBLICATIONS

Chinese Office Action received from the Chinese IP Office, for Chinese Patent Application No. 2013800130390, dated Jun. 5, 2017.

(Continued)

*Primary Examiner* — Omoniyi Obayanju
(74) *Attorney, Agent, or Firm* — Baker Botts L.L.P.

(57) ABSTRACT

In one embodiment, a mobile computing device has a first processor and a second processor. The mobile device determines an operating condition of the mobile device, the operating condition being based on at least the current time of day, a current activity of a user associated with the mobile device, or a current proximity of the mobile device to a place connected to the user of the mobile device through an on-line social network. If the operating conditions of the mobile device are satisfied, the first processor of the mobile device sends a message to the second processor of the mobile device, the message causing the second processor to transition from a sleep state to an active state.

20 Claims, 8 Drawing Sheets

(51) Int. Cl.
  *G06Q 30/02* (2012.01)
  *G06Q 50/00* (2012.01)
  *H04W 52/36* (2009.01)
  *H04W 4/21* (2018.01)
  *H04W 4/029* (2018.01)
  *H04W 4/02* (2018.01)
  *H04L 29/08* (2006.01)
  *H04W 52/28* (2009.01)

(52) U.S. Cl.
  CPC ............ *G06Q 50/01* (2013.01); *H04W 4/023* (2013.01); *H04W 4/029* (2018.02); *H04W 4/21* (2018.02); *H04W 52/367* (2013.01); *H04L 67/306* (2013.01); *H04W 4/025* (2013.01); *H04W 52/283* (2013.01); *Y02D 70/00* (2018.01); *Y02D 70/1242* (2018.01); *Y02D 70/1262* (2018.01); *Y02D 70/142* (2018.01); *Y02D 70/144* (2018.01); *Y02D 70/146* (2018.01); *Y02D 70/164* (2018.01); *Y02D 70/22* (2018.01)

(58) Field of Classification Search
  USPC ........................................... 455/456.1, 456.3
  See application file for complete search history.

(56) References Cited

U.S. PATENT DOCUMENTS

| | | | |
|---|---|---|---|
| 2008/0188187 A1* | 8/2008 | Armstrong | G06F 1/3203 455/73 |
| 2008/0255759 A1* | 10/2008 | Abhyanker | G06Q 10/00 701/533 |
| 2009/0098880 A1 | 4/2009 | Lindquist | |
| 2009/0163226 A1 | 6/2009 | Karkaria | |
| 2009/0164120 A1 | 6/2009 | Boore | |
| 2011/0250875 A1 | 10/2011 | Huang et al. | |
| 2012/0150870 A1* | 6/2012 | Liao | G06F 17/3082 707/748 |

OTHER PUBLICATIONS

Summons to attend oral proceedings received from European Patent Office for EP Application No. 13757856.3-1853 / 2823655, Jun. 4, 2017.
Canadian Office Action received from the Canadian Intellectual Property, for Canadian Patent Application No. 2,955,522, dated Feb. 23, 2017.
Examination Report No. 1 for Standard Patent Application No. 2017272247, dated Jan. 31, 2018.
Notification of Reasons for Rejection for JP Patent Application No. 2016-243243, dated Feb. 13, 2018.

* cited by examiner

SUBSTANTIALLY CONTINUOUS LOCATION LOGGING FOR GEOGRAPHIC-POSITIONING CAPABLE DEVICES

PRIORITY

This application is a continuation under 35 U.S.C. § 120 of U.S. patent application Ser. No. 13/417,013, filed 9 Mar. 2012.

TECHNICAL FIELD

This disclosure relates generally to geographic positioning-capable devices, and, more particularly, to methods of continuously logging locations relevant to a user.

BACKGROUND

A social networking system, such as a social networking website, enables its users to interact with it and with each other through the system. The social networking system may create and store a record, often referred to as a user profile, in connection with the user. The user profile may include a user's demographic information, communication channel information, and personal interest. The social networking system may also create and store a record of a user's relationship with other users in the social networking system (e.g., social graph), as well as provide services (e.g., wall-posts, photo-sharing, or instant messaging) to facilitate social interaction between users in the social networking system. A geo-social networking system is a social networking system in which geographic services and capabilities are used to enable additional social interactions. User-submitted location data or geo-location techniques (e.g., mobile phone position logging) can allow a geo-social network system to connect and coordinate users with local people or events that match their interests. For example, users can check-in to a place using a mobile client application by providing a name of a place (or selecting a place from a pre-established list of places). The geo-social networking system, among other things, can record information about the user's presence at the place and possibly provide this information to other users of the geo-social networking system.

A geographic location of a mobile device (e.g., a cell phone, a tablet computer) equipped with cellular, Wi-Fi and/or GPS (Global Positioning System) capabilities can be identified with geographic positioning signals obtained by cell tower triangulation, Wi-Fi positioning, and/or GPS positioning. Such mobile devices may have additional functionalities incorporating geographic location data of the devices, for example, providing driving directions, displaying a map of a current location, or providing information of nearby points of interest such as restaurants, gas stations, etc.

DESCRIPTION OF EXAMPLE EMBODIMENTS

Figure 1:
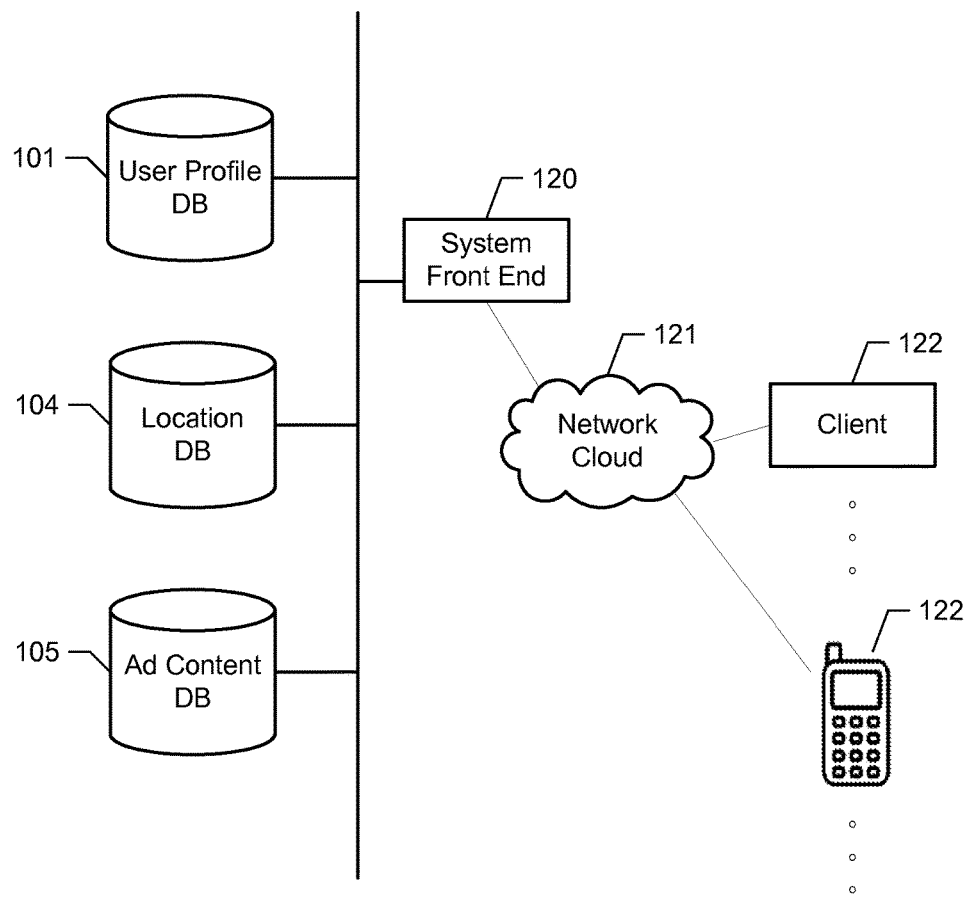
FIG. 1 illustrates an example social networking system.

A social networking system, such as a social networking website, enables its users to interact with it, and with each other through, the system. Typically, to become a registered user of a social networking system, an entity, either human or non-human, registers for an account with the social networking system. Thereafter, the registered user may log into the social networking system via an account by providing, for example, a login ID or username and password. As used herein, a "user" may be an individual (human user), an entity (e.g., an enterprise, business, or third party application), or a group (e.g., of individuals or entities) that interacts or communicates with or over such a social network environment.

When a user registers for an account with a social networking system, the social networking system may create and store a record, often referred to as a "user profile", in connection with the user. The user profile may include information provided by the user and information gathered by various systems, including the social networking system, relating to activities or actions of the user. For example, the user may provide his name, profile picture, contact information, birth date, gender, marital status, family status, employment, education background, preferences, interests, and other demographical information to be included in his user profile. The user may identify other users of the social networking system that the user considers to be his friends. A list of the user's friends or first degree contacts may be included in the user's profile. Connections in social networking systems may be in both directions or may be in just one direction. For example, if Bob and Joe are both users and connect with each another, Bob and Joe are each connections of the other. If, on the other hand, Bob wishes to connect to Sam to view Sam's posted content items, but Sam does not choose to connect to Bob, a one-way connection may be formed where Sam is Bob's connection, but Bob is not Sam's connection. Some embodiments of a social networking system allow the connection to be indirect via one or more levels of connections (e.g., friends of friends). Connections may be added explicitly by a user, for example, the user selecting a particular other user to be a friend, or automatically created by the social networking system based on common characteristics of the users (e.g., users who are alumni of the same educational institution). The user may identify or bookmark websites or web pages he visits frequently and these websites or web pages may be included in the user's profile.

The user may provide information relating to various aspects of the user (such as contact information and interests) at the time the user registers for an account or at a later time. The user may also update his or her profile information at any time. For example, when the user moves, or changes a phone number, he may update his contact information. Additionally, the user's interests may change as time passes, and the user may update his interests in his profile from time to time. A user's activities on the social networking system, such as frequency of accessing particular information on the system, may also provide information that may be included in the user's profile. Again, such information may be updated from time to time to reflect the user's most-recent activities. Still further, other users or so-called friends or contacts of the user may also perform activities that affect or cause updates to a user's profile. For example, a contact may add the user as a friend (or remove the user as a friend). A contact may also write messages to the user's profile pages—typically known as wall-posts. A user may also input status messages that get posted to the user's profile page.

A social network system may maintain social graph information, which can generally model the relationships among groups of individuals, and may include relationships ranging from casual acquaintances to close familial bonds. A social network may be represented using a graph structure. Each node of the graph corresponds to a member of the social network. Edges connecting two nodes represent a relationship between two users. In addition, the degree of separation between any two nodes is defined as the minimum number of hops required to traverse the graph from one node to the other. A degree of separation between two users can be considered a measure of relatedness between the two users represented by the nodes in the graph.

Social networking system may maintain a database of information relating to geographic locations or places. Places may correspond to various physical locations, such as restaurants, bars, train stations, airports and the like. In one implementation, each place can be maintained as a hub node in a social graph or other data structure maintained by the social networking system, as described in U.S. patent application Ser. No. 12/763,171, which is incorporated by reference herein for all purposes. Social networking system may allow users to access information regarding each place using a client application (e.g., a browser) hosted by a wired or wireless station, such as a laptop, desktop or mobile device. For example, social networking system may serve web pages (or other structured documents) to users that request information about a place. In addition to user profile and place information, the social networking system may log or maintain other information about the user. For example, the social networking system may support geo-social networking system functionality including one or more location-based services that record the user's location. For example, users may access the geo-social networking system using a special-purpose client application hosted by a mobile device of the user (or a web- or network-based application using a browser client). The client application may automatically access Global Positioning System (GPS) or other geo-location functions supported by the mobile device and report the user's current location to the geo-social networking system. In addition, the client application may support geo-social networking functionality that allows users to check-in at various locations and communicate this location to other users. A check-in to a given place may occur when a user is physically located at a place and, using a mobile device, access the geo-social networking system to register the user's presence at the place. A user may select a place from a list of existing places near to the user's current location or create a new place. The social networking system may automatically checks in a user to a place based on the user's current location and past location data, as described in U.S. patent application Ser. No. 13/042,357 filed on Mar. 7, 2011, which is incorporated by reference herein for all purposes. An entry including a comment and a time stamp corresponding to the time the user checked in may be displayed to other users. For example, a record of the user's check-in activity may be stored in a database. Social networking system may select one or more records associated with check-in activities of users at a given place and include such check-in activity in web pages (or other structured documents) that correspond to a given place. The check-in activity may also be displayed on a user profile page and in news feeds provided to users of the social networking system.

Still further, a special purpose client application hosted on a mobile device of a user may be configured to continuously capture location data of the mobile device and send the location data to social networking system. In this manner, the social networking system may log the user's location and provide various recommendations to the user related to places that are proximal to the user's current trajectory or path or that are frequented by the user. In one implementation, a user may opt in to this recommendation service, which causes the client application to periodically post location data of the user to the social networking system.

In particular embodiments, the social networking system may receive location data from numerous mobile devices of users of the social networking system. Location data for each of these mobile devices may be continuously captured by the respective devices (e.g., by special purpose client applications hosted on these mobile devices) and transmitted to the social networking system. The social networking system may then log the locations of all of the users whose devices send it location information, and use this information to push notifications to one or more of these users. As an example, a push notification system of the social networking system may alert the mobile device of a first user that another user of the social network (e.g., a friend or first-degree social contact) is in proximity to the first user. Any suitable criteria may be used by the social networking system (including, for example, whether two users are friends or contacts, and whether they are first-degree contacts or lesser-degree contacts) to determine which other users are of interest to a particular user and what distance is small enough to the user to be of relevance (e.g., 1 mile if the user is moving slowly, or 10 miles if the user is moving more quickly). Users of the social networking system may, in certain embodiments, choose to opt in or opt out of receiving these types of push notifications. A user may also define other settings within the social network, including settings to allow or prevent other users from receiving such location-based push notifications based on the first user's location.

A social networking system may maintain a database of advertising content from advertisers, and generate and communicate advertisements to users of the social networking system. The social networking system may increase effectiveness of advertising by providing an advertisement that is targeted to a user who is likely to be interested in the advertisement. U.S. application Ser. No. 12/195,321, incorporated by reference in its entirety for all purposes, describes a system that selects advertisements by matching targeting criteria of advertisements and a user's profile information and past actions, and presents the selected advertisements to the user. The social networking system may also generate and communicate advertisements to a user based on the user's social graph information. For example, in additional to presenting an advertisement that is targeted to a particular user, the social networking system may communicate information about the advertisement to other users connected to the particular user. U.S. application Ser. No. 12/193,702 describes a system that selects advertisements for a targeted user by matching targeting criteria of advertisements and past actions of another user connected to the targeted user, and presented information about the matched action and the selected advertisements to the targeted user.

FIG. 1 illustrates an example social networking system. In particular embodiments, the social networking system may store user profile data and social graph information in user profile database 101. In particular embodiments, the social networking system may store geographic and location data in location database 104. In particular embodiments, the social networking system may store advertising content and associated information in advertising content database 105. For example, advertising content can include advertising messages and media data (e.g., graphic arts, photos, video clips). For example, information associated with the advertising content can include information about advertisers (e.g., name, URL), business category (e.g., sporting goods, Japanese restaurant, retail clothing), one or more locations, and targeting criteria (e.g., a certain age group, a certain interest). In one implementation, an administrator of a hub node corresponding to a place maintained by the geo-social networking system may configure one or more advertisements, offers or coupons that may be presented to a user. In particular embodiments, databases 101, 104, and 105 may be operably connected to the social networking system's front end. In particular embodiments, the front end 120 may interact with client device 122 through network cloud 121. Client device 122 is generally a computer or computing device including functionality for communicating (e.g., remotely) over a computer network. Client device 122 may be a desktop computer, laptop computer, personal digital assistant (PDA), in- or out-of-car navigation system, smart phone or other cellular or mobile phone, or mobile gaming device, among other suitable computing devices. Client device 122 may execute one or more client applications, such as a web browser (e.g., Microsoft Windows Internet Explorer, Mozilla Firefox, Apple Safari, Google Chrome, and Opera, etc.) or special-purpose client application (e.g., Facebook for iPhone, etc.), to access and view content over a computer network. Front end 120 may include web or HTTP server functionality, as well as other functionality, to allow users to access the social networking system. Network cloud 121 generally represents a network or collection of networks (such as the Internet or a corporate intranet, or a combination of both) over which client devices 122 may access the social network system.

In particular embodiments, location database 104 may store an information base of places, where each place includes a name, a geographic location and meta information (such as the user that initially created the place, reviews, comments, check-in activity data, and the like). Places may be created by administrators of the system and/or created by users of the system. For example, a user may register a new place by accessing a client application to define a place name and provide a geographic location and cause the newly created place to be registered in location database 104. As discussed above, a created place may correspond to a hub node, which an administrator can claim for purposes of augmenting the information about the place and for creating ads or other offers to be delivered to users. In particular embodiments, system front end 120 may construct and serve a web page of a place, as requested by a user. In some embodiments, a web page of a place may include selectable components for a user to "like" the place or check in to the place. In particular embodiments, location database 104 may store geo-location data identifying a real-world geographic location of a user associated with a check-in. For example, a geographic location of an Internet-connected computer can be identified by the computer's IP address. For example, a geographic location of a cell phone equipped with cellular, Wi-Fi and/or GPS capabilities can be identified by cell tower triangulation, Wi-Fi positioning, and/or GPS positioning. In particular embodiments, location database 104 may store a geographic location and additional information of a plurality of places. For example, a place can be a local business, a point of interest (e.g., Union Square in San Francisco, Calif.), a college, a city, or a national park. For example, a geographic location of a place (e.g., a local coffee shop) can be an address, a set of geographic coordinates (latitude and longitude), or a reference to another place (e.g., "the coffee shop next to the train station"). For example, additional information of a place can be business hours, photos, advertisements, or user reviews of the place. In particular embodiments, location database 104 may store a user's location data. For example, a user can create a place (e.g., a new restaurant or coffee shop) and the social networking system can store the created place in location database 104. For example, location database 104 may store a user's check-in activities. For example, location database 104 may store a user's geographic location provided by the user's GPS-equipped mobile device.

Figure 2:
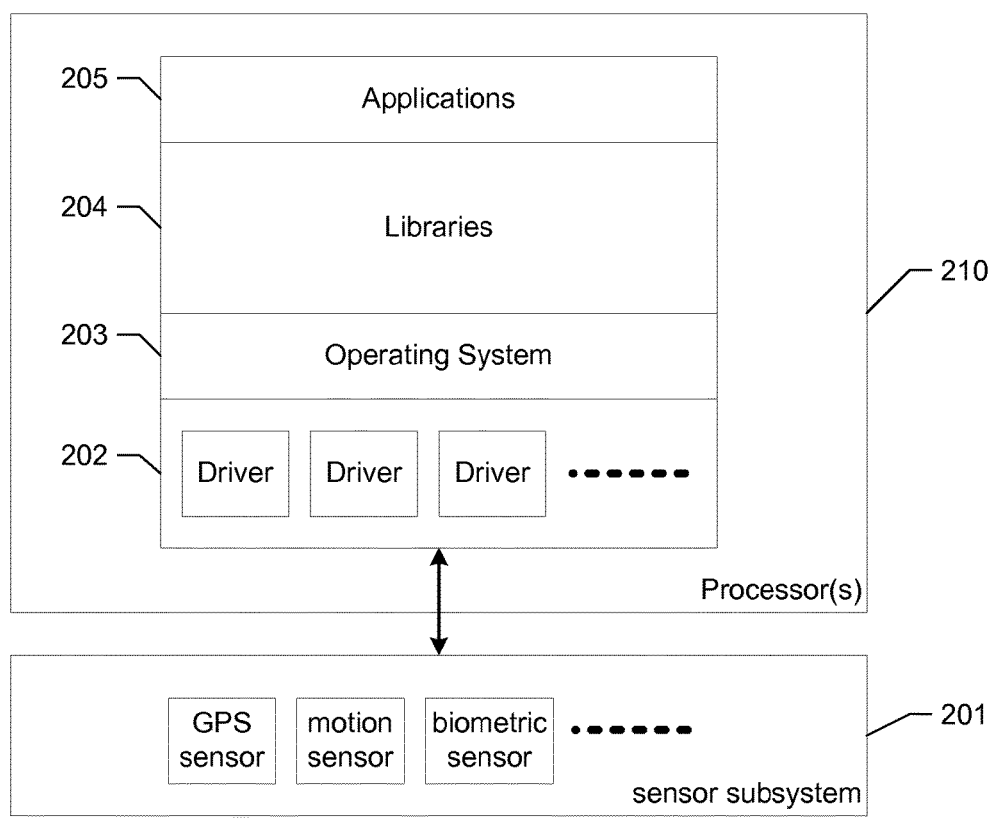
FIG. 2 illustrates an example processing stack of a mobile device with one or more sensor devices.

A mobile device system may comprise one or more sensor devices to provide additional inputs and facilitate multiple functionalities of the system. Processing of sensor inputs by a system with one or more sensor devices (for example, processing a GPS sensor signal and displaying in the device's graphical user interface a map of a location corresponding to the GPS sensor signal) may be implemented by a combination of hardware, software, and/or firmware (or device drivers). FIG. 2 illustrates an example processing stack of a mobile device (e.g., a smart phone) with one or more sensor devices. In the example of FIG. 2, sensor subsystem 201 of the mobile device can include one or more sensor devices, for example, a GPS sensor for location positioning, and a motion sensor for determining orientation of the mobile device, etc. One or more device drivers in driver layer 202 hosted by one or more processors 210 of the mobile device can communicate and control the one or more sensors of sensor subsystem 201. For example, a device driver can receive and process GPS signals generated by a GPS sensor. For example, one or more device drivers can receive and process sensor signals generated by multiple sensors in sensor subsystem 201. One or more processors 210 can host various software programs, for example, operating system 203 running one or more application programs (e.g., web browser, address book, etc.) in applications 205 and managing sensor subsystem 201 via the one or more device drivers in driver layer 202. Libraries 204 can include one or more libraries used by one or more application programs in applications 205. For example, a web browser application can access a mapping library (e.g., via a function call) that generates a map containing a GPS location obtained by a device driver interpreting a GPS signal from a GPS sensor, and display the map in the web browser application's graphical user interface.

One or more processors of a system, while not being active (i.e., not executing one or more programs), can enter a sleep state to reduce energy consumption by the system. For example, in an example sleep state, all computing states of a processor are saved in a main memory and the processor is powered off. In another example sleep state, a processor does not execute instructions during this state, but all computing states of the processor are still maintained in the processor (e.g., stored in the processor's cache).

Ordinarily, in order for a system comprising one or more sensors to access a sensor (or process a sensor signal) of the system, one or more processors of the system need to be in an active state to access the sensor via a device driver. For example, for a special-purpose client application hosted on a user's mobile device to continuously capture locations of the user and alert the user if the user is near one or more points of interest (i.e., locations that may be interesting or useful to the user), one or more processors of the mobile device need to be in an active state to access a GPS sensor driver as often as the sampling frequency of the continuous location capture (e.g., every five minutes), even when there is little movement by the user (e.g., the user is attending a meeting for the next two hours). Especially for mobile devices and other battery-powered devices, the one or more processors could be in a sleep state instead of being in the active state. This can cause unnecessary periods of the active state, or duty cycles, of the one or more processors of the mobile device, thus causing higher energy consumption and shorter battery life of the mobile device. Furthermore, many points of interests that a particular user may be near or pass by may not be relevant to that user. For example, if a particular user is in a metropolitan downtown area, there can be thirty points of interest within a half mile radius (e.g., coffee shops, restaurants, museums, etc.), but there may be one restaurant that is most relevant to the particular user— e.g., if three of the particular user's first-degree contacts had just checked in to the restaurant in the past 15 minutes. Instead of processing every point of interest that the particular user walks by, the one or more processors of the mobile device can be in a sleep mode until the particular user is near the restaurant, then wake up and alert the particular user about the presence of the three first-degree contacts. In other implementations, a radius extending from the location of a point of interest may define a region that when crossed by the user may cause an alert to be transmitted to the user. In some implementations, the radius (and corresponding region) may be increased or decreased to adjust the likelihood that a user will receive a notification. The radius can be adjusted by a variety of factors, such as a user's interests, past activities (such as check-ins), contacts at a given location, and whether an advertiser has configured an advertisement for the place.

Particular embodiments herein describe methods of determining a set of locations relevant to a user, and dynamically determining processor duty cycle of the user's mobile device while continuously logging the set of relevant locations with the mobile device's geographic positioning device. Particular embodiments utilize a geographic positioning device of the mobile device that can be programmed to execute programs for controlling a geographic position sensing circuit, translating geographic positioning signals from the geographic position sensing circuit to geographic locations, performing computations (e.g., calculating a distance between two geographic locations obtained from the geographic position sensing circuit, or determining whether a condition is met), and alerting the one or more processors of the mobile device if a condition is met (e.g., if a distance calculated is less than a pre-determined threshold).

In some embodiments, the geographic positioning device may comprise a geographic position sensing circuit that receives geographic positioning signals (e.g., a GPS sensor), a memory, one or more lower-power processors that can be programmed to execute programs to control the geographic position sensing circuit and perform computations, and an interface circuit (e.g., I2C bus) that communicates with the one or more processors of the mobile device. In one embodiment, the geographic positioning device may be implemented as a single module or a single integrated circuit situated within the mobile device, comprising the geographic position sensing circuit, the memory, and the one or more lower-power processors, operably coupled to the one or more processors of the mobile system via the interface circuit. In other embodiments, the geographic positioning device may be incorporated into a sensor hub (such as the sensor subsystem of the mobile device illustrated in FIG. 2) comprising one or more sensor circuits that receive one or more sensor signals (including geographic positioning signals such as GPS signals), a memory, one or more lower-power processors that can be programmed to control the sensor circuits and perform computations (such as calculating a distance between two geographic locations described above), and an interface circuit that communicates with the one or more processors of the mobile device. In one embodiment, the sensor hub may be implemented as a single module or a single integrated circuit situated within the mobile device, comprising the one or more sensor circuits, the memory, and the one or more lower-power processors, operably coupled to the one or more processors of the mobile device via the interface circuit.

As discussed herein, processing of GPS location signals and determining whether a current location of the mobile device is within one or more defined regions can be offloaded to the GPS processing circuit and/or sensor hub in order to conserve power relative to waking up the main CPU of the device to perform such comparisons. For example, the main CPU of the mobile device can execute a client-side process to transmit to the social networking system a message comprising a user's current location and user identifier, causing a server-side process at the social networking system to generate, based on the current location and user identifier, a set of locations relevant to the user, and transmit the set of locations to the mobile device. In certain embodiments, a user's location information may not be immediately transmitted to the social networking system but may first be aggregated or batched before being sent. As an example, five such location capture messages may be collected at the mobile device by the client-side process before being transmitted to the social networking system. This may allow for power savings in situations where the overhead cost of transmission between the mobile device and the social network is high. The client-side process executed by the main CPU of the mobile device can store the location information and a default radius in a memory accessible to the sensor hub. While the main CPU of the mobile device enters a sleep state to conserve power, a process or thread implemented by the sensor hub with the lower power processor can continue comparing current locations to the location information stored in the memory and, if the lower power processor of the sensor hub determines that a current location is within the radius from one or more locations of the set of locations, the lower power processor can wake up the main CPU to process the event and perform one or more responsive operations, such as issuing a notification to display to the user. For purposes of this disclosure, "main CPU process" refers to a process or thread that is executed by a main CPU or processor of a device, while an "offloaded process" refers to a process or thread implemented by a lower power circuit or processor, such as a GPS sensor or sensor hub coupled with one or more lower-power processors.

Figure 3:
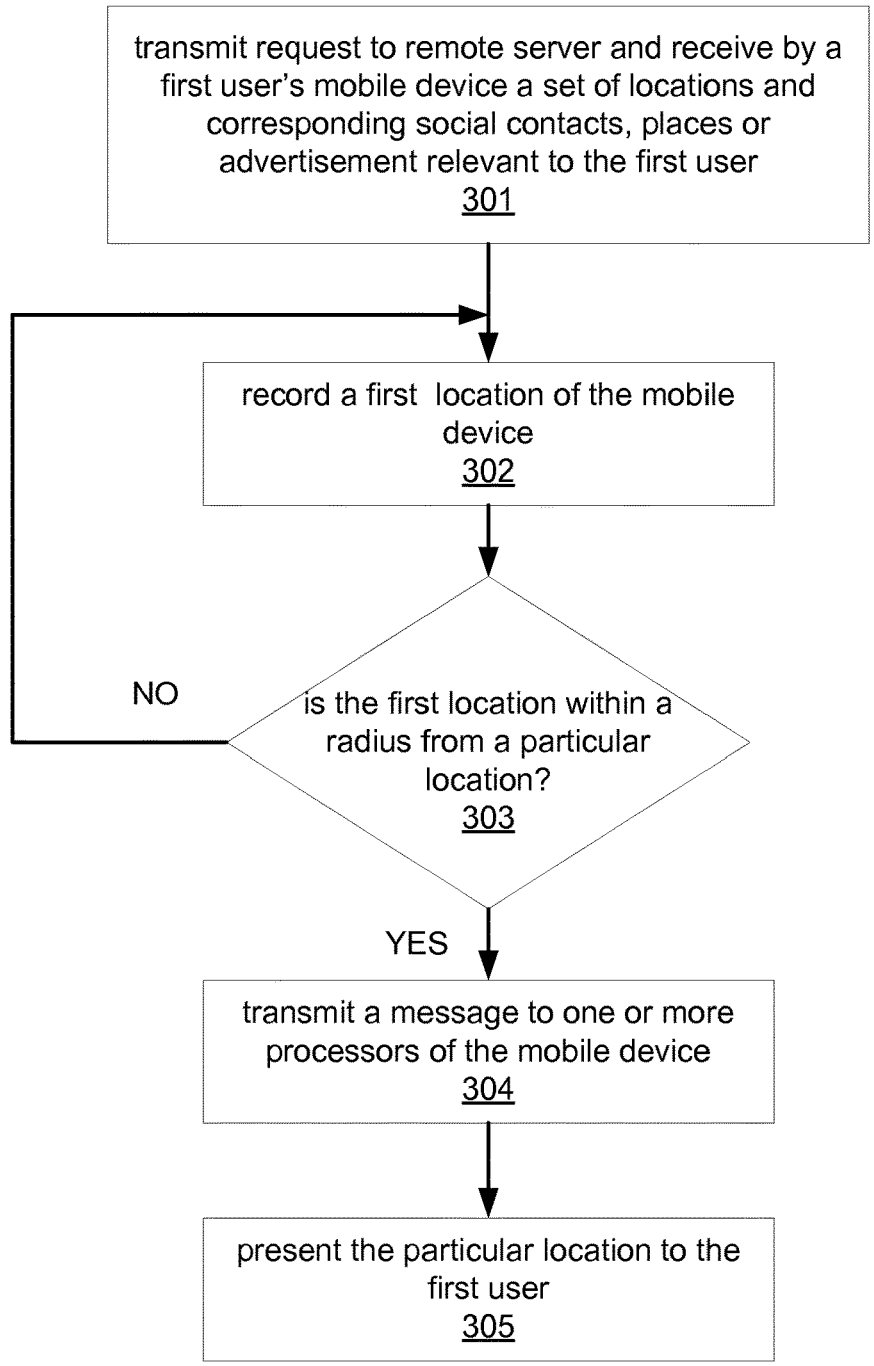
FIG. 3 illustrates an example method of location logging based on geographic positioning signals.

FIG. 3 illustrates an example method of location logging based on geographic positioning signals. The example method of FIG. 3 can be implemented by a first user's mobile device in connection with a server-side location recommendation process hosted by one or more computing devices of the social networking system. In particular embodiments, the first user's mobile device (e.g., a mobile phone, netbook, smartphone, tablet, or other portable device) may comprise one or more main processors, and a geographic positioning device (or a sensor hub) coupled with one or more lower-power processors. In particular embodiments, a main CPU process hosted by a main processor of the first user's mobile device may transmit a request to a remote server including a current location and receive a set of locations and corresponding social contacts, places and/or advertisements identified, in one implementation, based on relevancy to the first user (301). In particular embodiments, the server-side location recommendation process hosted on the remote server may create a ranked list of locations based on the first user's current location data. For example, the server-side location recommendation process may access location database 104 for a list of locations within a pre-determined distance (e.g., two miles) from the first user's current location, and rank the list of locations based on a distance from the first user's current location (e.g., locations closest to the first user are ranked to the top of the ranked list), as well as other factors discussed below. For example, in particular embodiments, the server-side location recommendation process may adjust the ranked list of locations based on relevancy to the first user. In particular embodiments, the server-side location recommendation process may adjust the ranked list of locations based on presence of one or more of the first user's social contacts. For example, the server-side location recommendation process can access user profile database 101 and location database 104, and identify one or more locations, from the ranked list of locations, that one or more of the first user's first-degree friends are currently present (e.g., based on place check-in data, or based on GPS coordinates). The server-side location recommendation process can rank locations with one or more of the first user's first-degree friends currently present, higher than other places in the ranked list of locations with none of the first user's first-degree friends currently present.

In particular embodiments, the server-side location recommendation process may adjust the ranked list of locations based on social proximity between the first user and one or more users associated with one or more locations of the ranked list of locations. For each location of the ranked list of locations, the server-side location recommendation process may access user profile database 101 and location database 104, and identify one or more social contacts of the first user who are associated with the location, for example, a social contact who is currently at the location (e.g., base on place check-in data), a social contact who had checked in before to a place corresponding to the location, or a social contact who made comments about a place corresponding to the location. In particular embodiments, the server-side location recommendation process may assign an affinity score to a first user's social contact and one or more locations associated with the social contact. For example, the server-side location recommendation process can assign an affinity score of 1.0 if a social contact is the first user's immediate family member (e.g., parents, siblings). For example, the server-side location recommendation process can assign an affinity score of 0.8 if a social contact is the first user's first-degree friend, and an affinity score of 0.7 if a social contact and the first user went to the same college during the same year. For example, the server-side location recommendation process can assign an affinity score of 0.3 to a location if no first user's social contact is associated with the location. An example system for measuring user affinity is described more generally in U.S. patent application Ser. No. 11/503,093, filed 11 Aug. 2006, which is hereby incorporated by reference in its entirety and for all purposes. U.S. patent application Ser. No. 12/978,265, filed 23 Dec. 2010 and entitled "Contextually Relevant Affinity Prediction in a Social Networking System," which is incorporated by reference in its entirety and for all purposes, describes example methods of predicting user affinity based on actions a user may perform in the social networking system. For example, the server-side location recommendation process can calculate an affinity score between the first user and a social contact associated with a location (thus a measure of affinity between the first user and the location) by giving more weighting to location related actions (e.g., place check-in) than other actions (e.g., playing online social games). In particular embodiments, the server-side location recommendation process may adjust the ranked list of locations based on the affinity scores.

In particular embodiments, the server-side location recommendation process may access location database 104 and advertising content database 105 to identity one or more advertisements corresponding to one or more locations from the list of locations. An example system of measuring user relevancy of advertisements based on category, location, time of delivery, previous actions, and common interests with social contacts is described more generally in U.S. patent application Ser. No. 12/977,027, filed 22 Dec. 2010 and entitled "Providing Relevant Notifications for a User Based on Location and Social Information," which is incorporated by reference in its entirety and for all purposes. For example, the server-side location recommendation process can assign an relevant score between the first user and an advertisement and a corresponding location (from the ranked list of locations), e.g., 1.0 for most relevant advertisements, 0.7 for less relevant advertisements, and 0.5 for locations with no corresponding advertisements, and adjust the ranked list of locations based on the relevant scores. In other embodiments, the location recommendation process may adjust the ranked list of locations based on existence of advertisements. For example, the server-side location recommendation process can access location database 104 and advertising content database 105, identify one or more locations (from the ranked list of locations) with corresponding advertisements, and rank the one or more locations to the top of the ranked list of locations.

In particular embodiments, the server-side location recommendation process may store the ranked list of locations for the first user in a data store (e.g., location database 104). In particular embodiments, the server-side location recommendation process may periodically update the ranked list of locations for the first user, or update the ranked list of locations in response to requests transmitted by the client device of the first user. For example, the server-side location recommendation process can update the ranked list of locations for the first user every hour during day time and every three hours during night time for the first user, and store the ranked list of locations in location database 104. In other embodiments, the server-side location recommendation process may periodically access the first user's current location data, and update the ranked list of locations if the first user has moved beyond (or almost beyond) a geographic area covering locations of the ranked list of locations.

In particular embodiments, the server-side location recommendation process may access the data store and transmit a set of locations comprising one or more locations of the ranked list of locations, and corresponding social contacts, places or advertisements, to the main CPU process hosted by the first user's mobile device. For example, the server-side location recommendation process can access location database 104 and transmit a set of locations comprising the top N ranked locations of the ranked list of locations, and corresponding social contacts, places or advertisements, to the main CPU process hosted by the first user's mobile device. For example, the value of N may depend on the size of available local storage of the first user's mobile device. In other embodiments, a special-purpose client application hosted by the first user's mobile device may access location database 104, retrieve a set of locations comprising top N ranked locations of the ranked list of locations and corresponding social contacts, places or advertisements, and store the set of locations in a local storage of the mobile device. In particular embodiments, the set of locations may further comprise a relevancy ranking for each location. For example, the server-side location recommendation process can assign the ranking order of the ranked list of locations as the relevancy ranking for each place of the ranked list of locations (e.g., 1 for the top ranked location, 2 for the second ranked location, etc.), and transmit the top 20 locations of the ranked list of locations and corresponding social contacts, places, or advertisement, and corresponding relevancy rankings to the main CPU process hosted by the first user's mobile device. For example, the server-side location recommendation process can calculate an average or weighted average of the affinity score and the relevant score described above as a relevancy ranking for each location of the ranked list of locations, and transmit the top 20 locations of the ranked list of locations and corresponding social contacts, places, or advertisement, and corresponding relevancy rankings to the main CPU process hosted by the first user's mobile device.

The example method of FIG. 3 utilizes a radius to define a region for each location and to determine whether the first user is near one or more locations relevant to the user based on geographic positioning signals obtained by the first user's mobile device. If a user is within a defined region, the geographic position circuit and/or sensor hub may alert or wake up one or more processors of the mobile device to process. In particular embodiments, the main CPU process hosted by the main processors of the first user's mobile device may determine a default radius (e.g., 500 feet) for each location of the set of locations.

Figure 4:
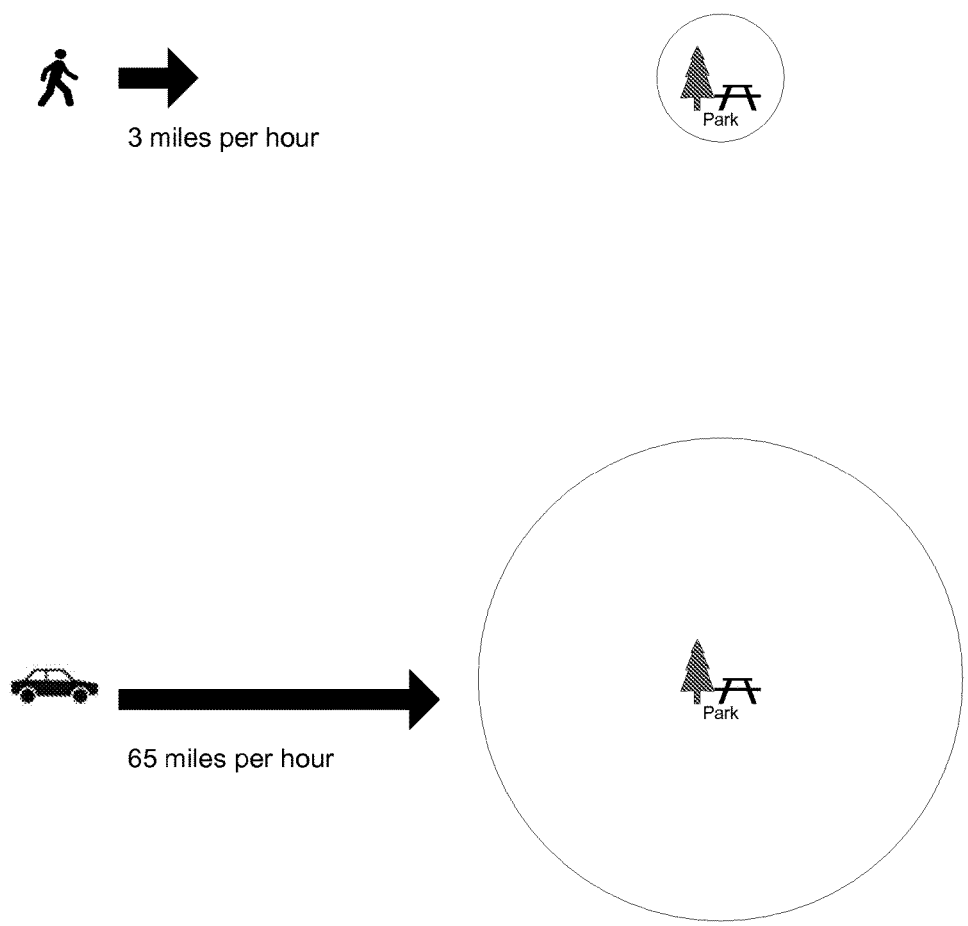
FIG. 4 illustrates example radii for the example method of FIG. 3.

In particular embodiments, the main CPU process may determine a radius for each location of the set of location based on a velocity of the mobile device. FIG. 4 illustrates example different radii based on a user's velocity for the example method of FIG. 3. For example, if a user is walking with a velocity of 3 miles per hour, the main CPU process can determine a radius of a quarter mile. For example, if a user has a higher velocity (e.g., the user is driving at 65 miles per hour), the main CPU process can determine a larger radius (e.g., 5 miles) so that there is enough time to alert the user about a relevant location (e.g., "park" in FIG. 4). In particular embodiments, if a user is stationary (e.g., the user is watching a movie at home), the main CPU process may assign a pre-determined value (e.g., 500 feet) to the radius of each location of the set of locations. In particular embodiments, the main CPU process may determine a velocity of the mobile device based on recent location data stored locally at the mobile device. In some embodiments, the main CPU process may determine a default velocity (e.g., 3 miles per hour) if no recent location data is available.

In particular embodiments, the main CPU process may determine a radius for each location of the set of locations based on time of day. For example, the main CPU process can access time of day information via a system call. For example, the main CPU process can determine a smaller radius (e.g., a quarter mile) if the time of day information corresponds to an evening hour (e.g., between 10 PM to 6 AM) since the first user is likely to have less movement. In other embodiments, the main CPU process may determine a radius for each location of the set of locations based on a power budget available for the mobile device. For example, main CPU process can access battery level information via a function call. For example, if the mobile device's battery level is less then a pre-determined threshold (e.g., 20% of full capacity), the main CPU process may determine a smaller radius so that there is less frequent detection of relevant locations, thus reducing power consumption and preserving remaining battery power. Yet in another embodiment, the main CPU process may determine a radius for each location of the set of locations based on an error associated with recording one or more locations. An error associated with one or more recorded locations may depend on one or more sources of the recording (e.g., GPS, cell-tower triangulation, etc.), movement of the mobile device, time of the recording, etc. For example, to avoid erroneous detection of location changes, the main CPU process can obtain (e.g., via a function call) an accuracy distance, e.g., a horizontal distance greater than the error associated with the one or more recorded locations, and determine a radius at least two times of the accuracy distance. In particular embodiments, the main CPU process may determine a radius for each location of the set of locations based on multiple factors, such as time of day, power budget, and/or errors associated with recorded locations described above. For example, the client-side location recommendation process can determine a radius based on a weighted average of radii determined by each individual factor. For example, the main CPU process can determine a radius based on power budget only if the mobile device's battery level is very low (e.g., 10% of full capacity).

In particular embodiments, the main CPU process may determine a radius for each location of the set of locations based on each location's relevancy ranking. The main CPU process may assign a larger radius for a location with a higher relevancy ranking, that is, a location with higher relevancy ranking may have a larger radius (than other locations) to "broadcast" its presence to the first user since the location is more relevant to the first user (than other locations). For example, the main CPU process can assign a radius of a half mile for locations with a relevancy ranking between 1 and 5, a radius of a quarter mile for locations with a relevancy ranking between 6 and 10, and a radius of 500 feet for the rest of the set of locations.

In particular embodiments, one or more radii for the set of locations may be user configurable. For example, a user may configure through a user interface of the main CPU process and set the radii for one or more locations with only corresponding advertisements but no corresponding social contacts to 100 feet, as the user may not be interested in advertisements.

In particular embodiments, the main CPU process may store location information of the set of locations in a memory accessible to the mobile device's geographic positioning device and the one or more lower-power processors. In particular embodiments, the main CPU process may cause an offloaded process implemented by the geographic positioning device coupled with the one or more lower-power processors to record a first location at a pre-determined frequency (302) (e.g., every 30 seconds, one minute, five minutes, etc.), and the offloaded process may access the memory and determine if for at least a particular location of the set of locations, the first location is within a region defined by a radius of the at least particular location extending from the at least particular location (303). That is, the offloaded process may look for whether the first user is within the defined regions of one or more locations of the set of locations. If the first user is not within the defined regions of one or more locations of the set of locations as determined by the offloaded process, the offloaded process may continue recording a first location at the pre-determined frequency (302), and if there is no other programs running on the main processors of the mobile device, the main CPU process may transition the main processors to a sleep state.

In particular embodiments, if the first location is within the region defined by the radius of the at least particular location extending from the at least particular location, the offloaded process may transmit a message to the one or more main processors of the mobile device (304). In particular embodiments, the message may comprise the at least particular location. In particular embodiments, the message may cause at least one of the one or more main processors of the mobile device to transition from a sleep state to an active state. In particular embodiments, the message may cause the main CPU process hosted by the main processors to process the at least particular location and create a notification to present to the first user (305) (e.g., a web page for checking in to the particular location, a coupon associated with the particular location, etc.).

Additionally, the main processors and/or the geographic positioning device coupled with the lower-power processors may continue executing processes for the example method of FIG. 3. For example, the offloaded process hosted by the geographic positioning device coupled with the lower-power processors may continue to record a first location at the pre-determined frequency and determine if the first location is near one or more locations of the set of locations (303). For example, the main CPU process hosted by the main processors may transmit a request to the social networking system for a new set of locations (301) after the notification to the first user (305). For example, the main CPU process may periodically (e.g., every hour during day time, and every 4 hours during night time) transmit a request to the social networking system for a new set of locations (301).

Figure 4A:
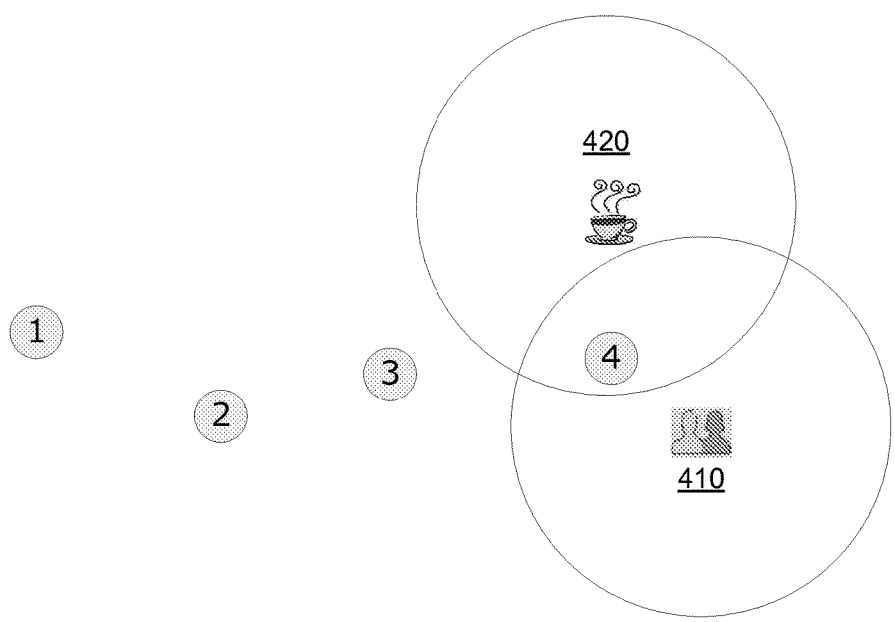
FIGS. 4A and 4B illustrate a user's movement.
Figure 4B:
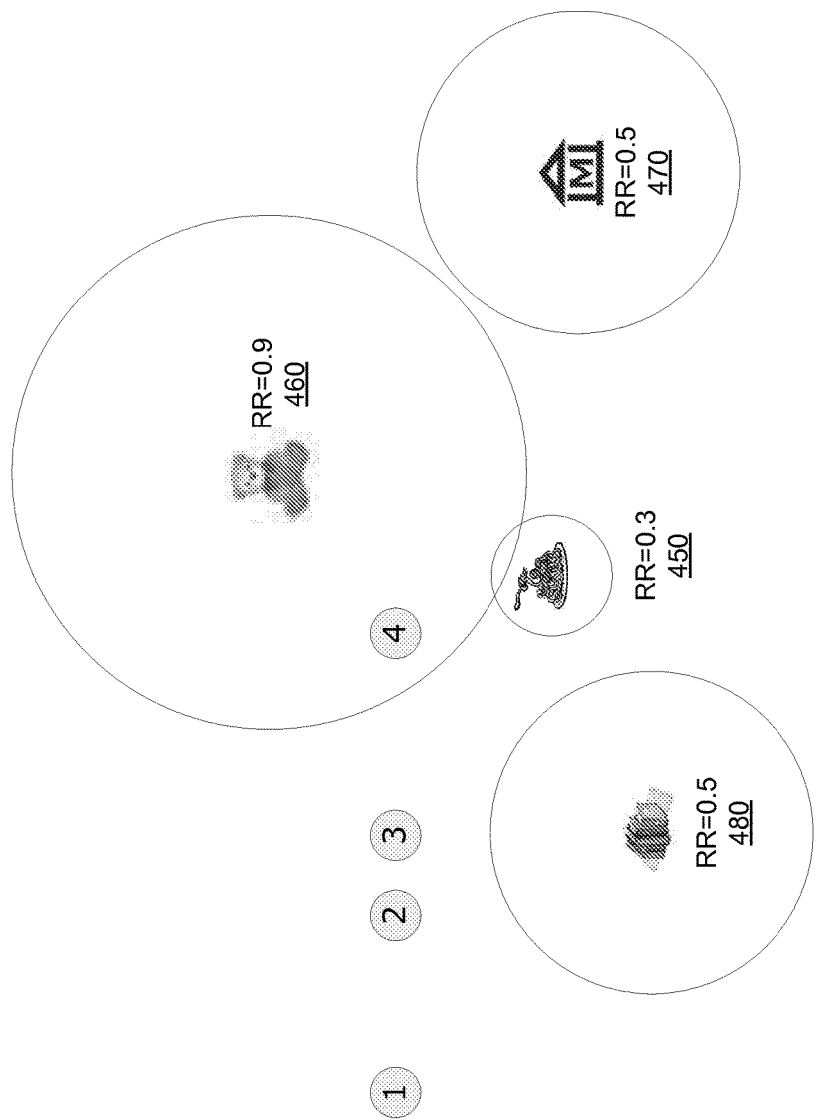

The example method of FIG. 3 can be further illustrated by FIGS. 4A and 4B. FIG. 4A illustrates a user's movement. In the example of FIG. 4A, a first user carries a GPS-equipped mobile phone is at location "1". A special-purpose client application hosted by one or more main processors of the mobile phone can continuously capture the first user's locations (by accessing a GPS sensor of the mobile phone via a device driver) and alert the first user nearby points of interests as the first user moves, at an interval of every five minutes. Ordinarily, one or more processors of the mobile device is active at least every five minutes in order to access the GPS sensor and determine presence of points of interests nearby. In contrast, with the example method of FIG. 3, the special-purpose client application can access location database 104 and receive a set of locations relevant to the first user, e.g., a place corresponding to a coffee shop 420 that the first user had frequently visited before, and a current location 410 of two of the first user's first-degree friends. The special-purpose client application can store the set of locations and a radius in a memory accessible to a sensor hub comprising a GPS sensor and other sensors and one or more lower-power processors, and cause an offloaded process hosted by the sensor hub to start recording a first location (location "1" in FIG. 4A) and determine whether the first location is within regions defined by the radii centered at locations 410 and 420, and if there is no other programs running on the one or more main processors at the time, the one or more main processors can enter a sleep state. The offloaded process hosted by the sensor hub can continue to record locations of the first user every five minutes, and determine whether the first user is within the defined regions of locations 410 and 420. For example, if the first user walks down a street and is not within the defined regions of location 410 and 420, as illustrated by locations "2", and "3" in FIG. 4A, the offloaded process hosted by the sensor hub with the one or more lower-power processors, which may consume substantially lower power than the one or more main processors of the mobile device, can continue to record the first user's locations every five minutes while the one or more main processors of the mobile device are at the sleep state. In the example of FIG. 4A, if the offloaded process determines that the first user is within the defined regions of location 410 and 420, as illustrated by location "4" in FIG. 4A, the offloaded process can transmit a message comprising locations 410 and 420, causing at least one of the one or more main processors transition from the sleep state to an active state, and execute the special-purpose client application to process locations 410 and 420. For example, the special-purpose client application can access an address book application hosted by the mobile device (or access user profile database 101 of the social networking system), and alert the first user that the two friends are nearby with user information of the two friends (e.g., profile pictures, news feeds, cell phone numbers). For example, the special-purpose client application can present to the first user a web page to check in the place corresponding to coffee shop 420. For example, the special-purpose client application can present to the first user an advertisement (e.g., a coupon) for the coffee shop.

FIG. 4B illustrates another example of a user's movement. In the example of FIG. 4B, a first user carries a GPS-equipped mobile phone is at location "1". A special-purpose client application hosted by one or more main processors of the mobile phone can access the mobile phone's location information (e.g., via a function call) and transmit a message comprising the first user's current location (e.g., location "1") to the social networking system, causing the server-side location recommendation process to provide to the special-purpose client application a set of locations relevant to the first user, and a corresponding relevancy ranking score for each location (e.g., restaurant 450 with a relevancy ranking score of 0.3, toy store 460 with a relevancy ranking score of 0.9, museum 470 with a relevancy ranking score of 0.5, bookstore 480 with a relevancy ranking score of 0.5). The special-purpose client application can assign a radius for each location of the set of locations based on each location's relevancy ranking score, for example, a radius of a half mile for a location with a relevancy ranking score between 1.0 and 0.6, a radius of a quarter mile for a location with a relevancy ranking score between 0.6 and 0.4, and a radius of 500 feet for a location with a relevancy ranking score less than 0.4, as illustrated in FIG. 4B, and store location and radius information for the set of locations in a memory accessible to the mobile phone's GPS sensor coupled with one or more lower-power processors. The special-purpose client application can cause an offloaded process hosted by the GPS sensor and the one or more lower-processors to record the first user's location every five minutes, and determine whether the first user is within one or more regions defined by the radii centered at locations 450, 460, 470, and 480. For example, if the first user walks down a street and has not entered one or more defined regions, as illustrated by locations "2" and "3" in FIG. 4B, the offloaded process hosted by GPS sensor and the one or more lower-power processors, which consume substantially less power than the one or more main processors, can continue to record the first user's location, and if there is no other programs running on the one or more main processors, the special-purpose client application can transition the one or more main processors to a sleep state. In the example of FIG. 4B, if the offloaded process determine that the first user has entered the region defined by the radius for location 460 (the toy store), as illustrated by location "4" in FIG. 4B, the offloaded process can transmit a message comprising location 460 to the one or more main processors, causing at least one of the one or more main processors transition from the sleep state to an active state, and execute the special-purpose client application to process location 460. For example, the special-purpose client application can present to the first user a web page to check in location 460 (the toy store). For example, the special-purpose client application can present to the first user an advertisement (e.g., a coupon) for the toy store. In the example of FIG. 4B, two other locations restaurant 450 and bookstore 480 may be geographically closer to the first user than toy store 460, however, the example method of FIG. 3 provides a notification to the first user about toy store 460 instead of the two other locations since toy store 460 is more relevant to the first user than the two other locations.

Figure 5:
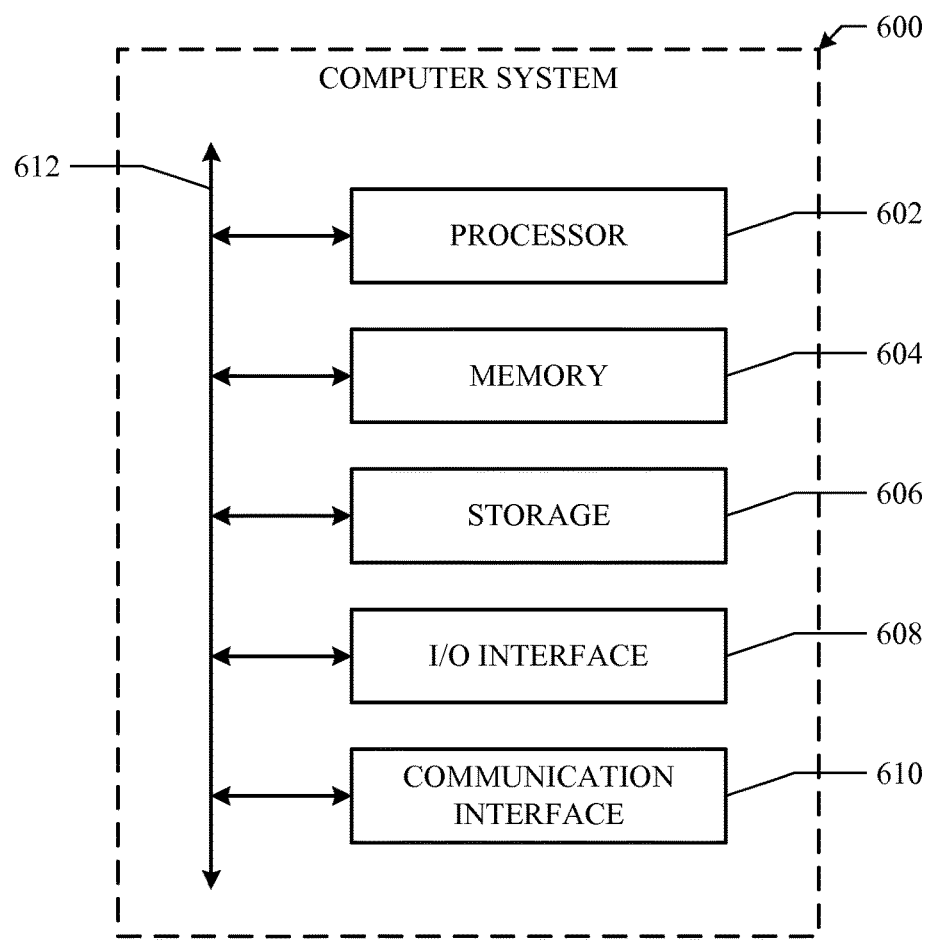
FIG. 5 illustrates an example computer system.

FIG. 5 illustrates an example computer system 600, which may be used with some embodiments of the present invention. This disclosure contemplates any suitable number of computer systems 600. In particular embodiments, computer system 600 includes a processor 602, memory 604, storage 606, an input/output (I/O) interface 608, a communication interface 610, and a bus 612. In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate Where appropriate, this RAM may be dynamic RAM (DRAM) or static RAM (SRAM).

In particular embodiments, storage 606 includes mass storage for data or instructions. As an example and not by way of limitation, storage 606 may include an HDD, a floppy disk drive, flash memory, an optical disc, a magneto-optical disc, magnetic tape, or a Universal Serial Bus (USB) drive or a combination of two or more of these. Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. In particular embodiments, I/O interface 608 includes hardware, software, or both providing one or more interfaces for communication between computer system 600 and one or more I/O devices. Computer system 600 may include one or more of these I/O devices, where appropriate. One or more of these I/O devices may enable communication between a person and computer system 600. Where appropriate, I/O interface 608 may include one or more device or software drivers enabling processor 602 to drive one or more of these I/O devices. I/O interface 608 may include one or more I/O interfaces 608, where appropriate.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, a Universal Asynchronous Receiver/Transmitter (UART) interface, a Inter-Integrated Circuit (I$^2$C) bus, a Serial Peripheral Interface (SPI) bus, a Secure Digital (SD) memory interface, a MultiMediaCard (MMC) memory interface, a Memory Stick (MS) memory interface, a Secure Digital Input Output (SDIO) interface, a Multi-channel Buffered Serial Port (McBSP) bus, a Universal Serial Bus (USB) bus, a General Purpose Memory Controller (GPMC) bus, a SDRAM Controller (SDRC) bus, a General Purpose Input/Output (GPIO) bus, a Separate Video (S-Video) bus, a Display Serial Interface (DSI) bus, a Advanced Microcontroller Bus Architecture (AMBA) bus, or another suitable bus or a combination of two or more of these. Bus 612 may include one or more buses 612, where appropriate. Although this disclosure describes and illustrates a particular bus, this disclosure contemplates any suitable bus or interconnect.

Figure 6:
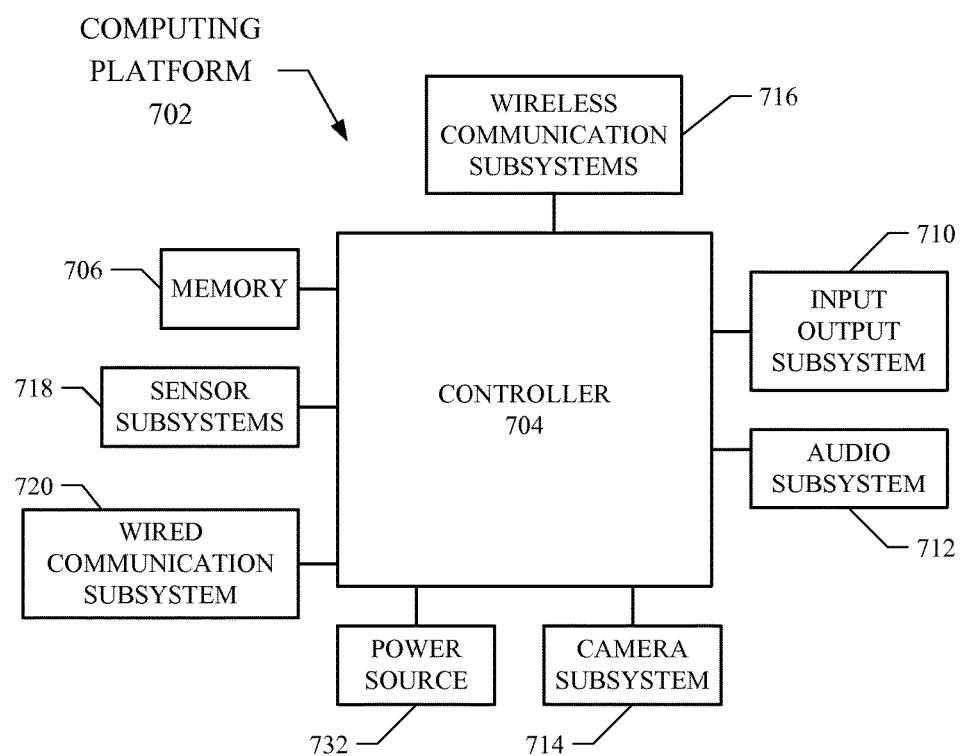
FIG. 6 illustrates an example mobile device platform.

The client-side functionality described above can be implemented as a series of instructions stored on a computer-readable storage medium that, when executed, cause a programmable processor to implement the operations described above. While the client device 122 may be implemented in a variety of different hardware and computing systems, FIG. 6 shows a schematic representation of the main components of an example computing platform of a client or mobile device, according to various particular embodiments. In particular embodiments, computing platform 702 may comprise controller 704, memory 706, and input output subsystem 710. In particular embodiments, controller 704 which may comprise one or more processors and/or one or more microcontrollers configured to execute instructions and to carry out operations associated with a computing platform. In various embodiments, controller 704 may be implemented as a single-chip, multiple chips and/or other electrical components including one or more integrated circuits and printed circuit boards. Controller 704 may optionally contain a cache memory unit for temporary local storage of instructions, data, or computer addresses. By way of example, using instructions retrieved from memory, controller 704 may control the reception and manipulation of input and output data between components of computing platform 702. By way of example, controller 704 may include one or more processors or one or more controllers dedicated for certain processing tasks of computing platform 702, for example, for 2D/3D graphics processing, image processing, or video processing.

Controller 704 together with a suitable operating system may operate to execute instructions in the form of computer code and produce and use data. By way of example and not by way of limitation, the operating system may be Windows-based, Mac-based, or Unix or Linux-based, or Symbian-based, among other suitable operating systems. The operating system, other computer code and/or data may be physically stored within memory 706 that is operatively coupled to controller 704.

Memory 706 may encompass one or more storage media and generally provide a place to store computer code (e.g., software and/or firmware) and data that are used by computing platform 702. By way of example, memory 706 may include various tangible computer-readable storage media including Read-Only Memory (ROM) and/or Random-Access Memory (RAM). As is well known in the art, ROM acts to transfer data and instructions uni-directionally to controller 704, and RAM is used typically to transfer data and instructions in a bi-directional manner. Memory 706 may also include one or more fixed storage devices in the form of, by way of example, hard disk drives (HDDs), solid-state drives (SSDs), flash-memory cards (e.g., Secured Digital or SD cards, embedded MultiMediaCard or eMMD cards), among other suitable forms of memory coupled bi-directionally to controller 704. Information may also reside on one or more removable storage media loaded into or installed in computing platform 702 when needed. By way of example, any of a number of suitable memory cards (e.g., SD cards) may be loaded into computing platform 702 on a temporary or permanent basis.

Input output subsystem 710 may comprise one or more input and output devices operably connected to controller 704. For example, input output subsystem may include keyboard, mouse, one or more buttons, thumb wheel, and/or, display (e.g., liquid crystal display (LCD), light emitting diode (LED), Interferometric modulator display (IMOD), or any other suitable display technology). Generally, input devices are configured to transfer data, commands and responses from the outside world into computing platform 702. The display is generally configured to display a graphical user interface (GUI) that provides an easy to use visual interface between a user of the computing platform 702 and the operating system or application(s) running on the mobile device. Generally, the GUI presents programs, files and operational options with graphical images. During operation, the user may select and activate various graphical images displayed on the display in order to initiate functions and tasks associated therewith. Input output subsystem 710 may also include touch based devices such as touch pad and touch screen. A touchpad is an input device including a surface that detects touch-based inputs of users. Similarly, a touch screen is a display that detects the presence and location of user touch inputs. Input output system 710 may also include dual touch or multi-touch displays or touch pads that can identify the presence, location and movement of more than one touch inputs, such as two or three finger touches.

In particular embodiments, computing platform 702 may additionally comprise audio subsystem 712, camera subsystem 712, wireless communication subsystem 716, sensor subsystems 718, and/or wired communication subsystem 720, operably connected to controller 704 to facilitate various functions of computing platform 702. For example, Audio subsystem 712, including a speaker, a microphone, and a codec module configured to process audio signals, can be utilized to facilitate voice-enabled functions, such as voice recognition, voice replication, digital recording, and telephony functions. For example, camera subsystem 712, including an optical sensor (e.g., a charged coupled device (CCD), or a complementary metal-oxide semiconductor (CMOS) image sensor), can be utilized to facilitate camera functions, such as recording photographs and video clips. For example, wired communication subsystem 720 can include a Universal Serial Bus (USB) port for file transferring, or a Ethernet port for connection to a local area network (LAN). Additionally, computing platform 702 may be powered by power source 732.

Wireless communication subsystem 716 can be designed to operate over one or more wireless networks, for example, a wireless PAN (WPAN) (such as, for example, a BLUETOOTH WPAN, an infrared PAN), a WI-FI network (such as, for example, an 802.11a/b/g/n WI-FI network, an 802.11s mesh network), a WI-MAX network, a cellular telephone network (such as, for example, a Global System for Mobile Communications (GSM) network, an Enhanced Data Rates for GSM Evolution (EDGE) network, a Universal Mobile Telecommunications System (UMTS) network, and/or a Long Term Evolution (LTE) network).

Sensor subsystem 718 may include one or more sensor devices to provide additional input and facilitate multiple functionalities of computing platform 702. For example, sensor subsystems 718 may include GPS sensor for location positioning, altimeter for altitude positioning, motion sensor for determining orientation of a mobile device, light sensor for photographing function with camera subsystem 714, temperature sensor for measuring ambient temperature, and/or biometric sensor for security application (e.g., fingerprint reader). Other input/output devices may include an accelerometer that can be used to detect the orientation of the device. In particular embodiments, various components of computing platform 702 may be operably connected together by one or more buses (including hardware and/or software). Additionally, computing platform 702 may be powered by power source 732.

Herein, reference to a computer-readable non-transitory storage medium may include a semiconductor-based or other integrated circuit (IC) (such as, for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, another suitable computer-readable non-transitory storage medium, or a suitable combination of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The present disclosure encompasses all changes, substitutions, variations, alterations, and modifications to the example embodiments herein that a person having ordinary skill in the art would comprehend. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
    determining, by one or more first processors of a mobile device, an operating condition of the mobile device, the operating condition comprising a current proximity of the mobile device to one or more places of a ranked list of places, the ranked list of places ranked based on a distance from a current location of the mobile device and an activity of one or more of the user's social contacts associated with each place of the ranked list of places accessed from a social-networking system; and
    if the operating condition satisfies the operating condition of the mobile device, then sending, by the first processors, a message to one or more second processors of the mobile device, the message causing one or more of the second processors to transition from a sleep state to an active state.

2. The method of claim 1, wherein the operating condition further comprises:
    a current time of day; or
    a current activity of a user associated with the mobile device.

3. The method of claim 2, where in the current location is based at least in part on:
    a global positioning system (GPS) signal;
    a Wi-Fi signal; or
    a cellular radio signal.

4. The method of claim 2, wherein the operating condition further comprises a predicted trajectory of the mobile device based on the current location and a location history of the mobile device.

5. The method of claim 1, wherein each of the one or more places are associated with one or more entities of the on-line social network.

6. The method of claim 5, wherein the user is further associated with the one or more entities through an on-line social network of the social-networking system.

7. The method of claim 2, wherein the operating condition comprises:
    determining that the current time of day corresponds to a time where a user of the mobile device is sleeping; and
    if the current time of day corresponds to a sleeping time of the user, then refraining from sending the message to the second processors.

8. The method of claim 2, wherein determining the current activity of the user comprises determining a relative location of the mobile device to the user.

9. One or more computer-readable non-transitory storage media within a mobile device, the media embodying logic that is operable when executed to:
    determine an operating condition of the mobile device, the operating condition comprising a current proximity of the mobile device to one or more places of a ranked list of places, the ranked list of places ranked based on a distance from a current location of the mobile device and an activity of one or more of the user's social contacts associated with each place of the ranked list of places accessed from a social-networking system; and
    if the operating condition satisfies the operating condition of the mobile device, then send a message to one or more second processors of the mobile device, the message causing one or more of the second processors to transition from a sleep state to an active state.

10. The media of claim 9, wherein the operating condition further comprises:
    a current time of day; or
    a current activity of a user associated with the mobile device.

11. The media of claim 10, where in the current location is based at least in part on:
    a global positioning system (GPS) signal;
    a Wi-Fi signal; or
    a cellular radio signal.

12. The media of claim 10, wherein the operating condition further comprises a predicted trajectory of the mobile device based on the current location and a location history of the mobile device.

13. The media of claim 9, wherein each of the one or more places are associated with one or more entities of the on-line social network.

14. The media of claim 13, wherein the user is further associated with the one or more entities through an on-line social network of the social-networking system.

15. The media of claim 10, wherein the operating condition comprises:
    determining that the current time of day corresponds to a time where a user of the mobile device is sleeping; and
    if the current time of day corresponds to a sleeping time of the user, then refraining from sending the message to the second processors.

16. The media of claim 10, wherein determining the current activity of the user comprises determining a relative location of the mobile device to the user.

17. A system comprising:
    one or more first processors;
    one or more second processors; and a memory coupled to the processors comprising instructions executable by the processors, the processors being operable when executing the instructions to:

determine an operating condition of the mobile device, the operating condition comprising a current proximity of the mobile device to one or more places of a ranked list of places, the ranked list of places ranked based on a distance from a current location of the mobile device and an activity of one or more of the user's social contacts associated with each place of the ranked list of places accessed from a social-networking system; and if the operating condition satisfies the operating condition of the mobile device, then send a message to one or more second processors of the mobile device, the message causing one or more of the second processors to transition from a sleep state to an active state.

18. The system of claim 17, wherein the operating condition further comprises:
a current time of day; or
a current activity of a user associated with the mobile device.

19. The system of claim 18, where in the current location is based at least in part on:
a global positioning system (GPS) signal;
a Wi-Fi signal; or
a cellular radio signal.

20. The system of claim 18, wherein the operating condition further comprises a predicted trajectory of the mobile device based on the current location and a location history of the mobile device.

* * * * *